United States Patent [19]

Segatta et al.

[11] Patent Number: 5,405,897
[45] Date of Patent: Apr. 11, 1995

[54] RUBBER STOCK CONTAINING PHENOXYACETIC ACID

[75] Inventors: Thomas J. Segatta, Fairlawn; Paul H. Sandstrom, Tallmadge, both of Ohio

[73] Assignee: The Goodyear Tire & Rubber Company, Akron, Ohio

[21] Appl. No.: 15,015

[22] Filed: Feb. 9, 1993

[51] Int. Cl.$^6$ ............................ C08K 3/36; C08K 5/09
[52] U.S. Cl. ................................... 524/290; 524/492; 524/493; 524/322
[58] Field of Search ............... 524/290, 492, 493, 322; 525/375, 385, 386, 262

[56] References Cited

U.S. PATENT DOCUMENTS

| | | | |
|---|---|---|---|
| 3,074,900 | 1/1963 | Wasserman et al. | 524/290 |
| 4,339,359 | 7/1982 | Bezwada | 524/512 |
| 4,412,041 | 10/1983 | Kitahara | 525/262 |
| 5,244,028 | 9/1993 | Segatta et al. | 524/492 |

FOREIGN PATENT DOCUMENTS

| | | |
|---|---|---|
| 0494131 | 7/1992 | European Pat. Off. . |
| 2048777 | 5/1970 | France . |
| 0319608 | 1/1972 | U.S.S.R. .............. 525/375 |

*Primary Examiner*—Peter A. Szekely
*Attorney, Agent, or Firm*—Bruce J. Hendricks

[57] ABSTRACT

The present invention relates to a rubber stock containing 0.1 to 10.0 phr of phenoxyacetic acid. Addition of the phenoxyacetic acid to a rubber stock increases the low strain stiffness properties of the rubber stock and results in increased treadwear when the stock is used in tread stocks. The phenoxyacetic acid may also be used in a rubber stock as a methylene acceptor or resorcinol replacement. In addition, the phenoxyacetic acid functions as a silica coupling agent and provides lower viscosities for processing the rubber stock compared to rubber stocks containing conventional silane coupling agents.

11 Claims, No Drawings

RUBBER STOCK CONTAINING PHENOXYACETIC ACID

BACKGROUND OF THE INVENTION

A pneumatic tire is a polymeric composite and typically contains scores of ingredients, each of which are added to achieve a specific function and overcome a problem. A frequent problem in making a rubber composite is maintaining good adhesion between the rubber and the reinforcement. A conventional method in promoting the adhesion between the rubber and the reinforcement is to generate a resin in-situ (in the vulcanized rubber/textile matrix) by compounding a vulcanizable rubber stock with a phenol/formaldehyde condensation product, The components of the condensation product consist of a methylene acceptor and a methylene donor. The most common methylene donors include N-(substituted oxymethyl) melamine, hexamethylenetetramine or hexamethoxymethylmelamine. A common methylene acceptor is a dihydroxybenzene compound such as resorcinol. Resorcinol is known to form a resin network within a rubbery polymer by reacting with various methylene donors. Unfortunately, the use of resorcinol has some inherent disadvantages. Resorcinol is not readily dispersed in rubber and in fact neither the resin, nor the resorcinol become chemically bound to the rubber. Additionally, resorcinol in its raw form is excessively volatile and is potentially an environmental hazard. Therefore, there exists a need to find a suitable resorcinol replacement.

In silica filled rubber stocks, silane coupling agents are commonly used. Silane coupling agents are in principle characterized by dual functionality. One function is an organo-functional group (such as aminoalkyl, mercaptoalkyl, etc.) and the other functional group is a readily hydrolyzable alkoxy group (such as $OCH_3$ or $—OC_2H_5$). In use, the alkoxy groups readily hydrolyze in the presence of moisture typically found on the surface of silica to form silanols that react with or otherwise condense in the presence of silica surface. The organo functional group reacts with the polymer matrix during vulcanization. In sulfur cured elastomers, mercaptosilanes are odoriferous, usually from impurities in the product. Mercaptosilanes also can act as cure accelerators and may tend to make the rubber compound scorchy. Because the alkoxy groups of the coupling agents readily hydrolyze upon storage, they are not as reactive. Therefore, there exists a need to find a suitable replacement for silane coupling agents.

Surprisingly, the present invention includes the use of phenoxyacetic acid in a rubber stock. The phenoxyacetic acid may function as a replacement for silane coupling agents and resorcinol without imparting any undesirable properties to the rubber stock.

SUMMARY OF THE INVENTION

The present invention relates to a rubber stock comprising (1) a rubber selected from the group consisting of natural rubber, rubbers derived from a diene monomer, or mixtures thereof and 0.1 to 10.0 phr of phenoxyacetic acid.

DETAILED DESCRIPTION OF THE PREFERRED EMBODIMENT

The present invention also relates to the incorporation of phenoxyacetic acid (sometimes referred to as PAC) as a silica coupling agent in a silica filled vulcanized rubber. One advantage of the present invention is that the silica filled rubber compounds containing phenoxyacetic acid exhibits lower viscosities for processing, and similar increased delta torque, modulus and elongation as silica filled rubber compounds containing silane coupling agents.

The phenoxyacetic acid may be used at various levels in the rubber compounds of the present invention. For example, the level may range from about 0.1 to 10.0 by weight per 100 parts of rubber (also known as "phr"). Preferably, the level ranges from about 2.0 to about 5.0 phr.

Rubber stocks containing natural rubber or rubbers derived from a diene monomer may be modified with phenoxyacetic acid according to the present invention. Examples of rubbers derived from a diene monomer include substituted and unsubstituted, saturated and unsaturated, synthetic polymers. The natural polymers include natural rubber in its various forms, e.g., pale crepe and smoked sheet, and balata and gutta percha. The synthetic polymers include those prepared from a single monomer (homopolymer) or a mixture of two or more copolymerizable monomers (copolymer) when the monomers are combined in the random distribution or block form. In addition to the diene monomers, other monomers may be used. Of all the monomers that may be used, the monomers may be substituted or unsubstituted and may possess one or more double bonds, for example, diene monomers, both conjugated and nonconjugated, and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alphamethylstyrene, methacrylic acid, methyl methacrylate, iraconic acid, ethyl methacrylate, glycidyl methacrylate and vinylidene chloride. Representative examples of the synthetic polymers used in the practice of this invention are polychloroprene, homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50% by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The rubber compounds which may be modified with phenoxyacetic acid are preferably cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

The vulcanizable rubber compositions of the present invention may contain a methylene donor. The term "methylene donor" is intended to mean a compound capable of reacting with the phenoxyacetic acid and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

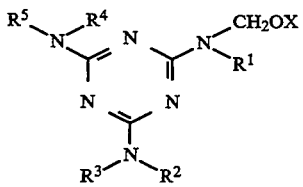

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N′,N″-trimethyl/N,-N′,N″-trimethylolmelamine, hexammethylolmelamine, N,N′,N″-dimethylolmelamine, N-methylolmelamine, N,N′-dimethylolmelamine, N,N′,N″-tris(methoxymethyl)melamine and N,N′N″-tributyl-N,N′,N″-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

The weight ratio of methylene donor to the phenoxyacetic acid may vary. Generally speaking, the weight ratio will range from about 1:10 to about 10:1. Preferably, the weight ratio ranges from about 1:3 to 3:1.

The silica filler that may be included in the rubber stock is a precipitated and generally amorphous silica. The amount of silica may vary depending on the type of rubber and the desired physical properties, i.e., modulus and hardness. Generally speaking, the amount may range from about 15 to about 100 phr. Preferably, the amount of silica that is included ranges from about 50 phr to about 100 phr. The surface area of the silica generally ranges from about 70 $m^2$ per gram to about 250 $m^2$ per gram. Preferably, the surface area ranges from about 140 $m^2$ per gram to about 160 $m^2$ per gram.

Vulcanization of the rubber stock of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the phenoxyacetic acid, other rubber additives may also be incorporated in the rubber stock. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the rubber compound, certain additives mentioned above are commonly used in conventional amounts. Typical additions of carbon black comprise about 0 to 100 parts by weight of diene rubber (phr), preferably 30 to 80 phr. In the case of high silica loadings (50–100 phr), carbon black might be used in the range of 0–20 phr. Typical amounts of tackifier resins comprise about 1 to 5 phr. Typical amounts of antiozonants comprise 1 to about 10 phr. Typical amounts of fatty acids such as stearic acid, palmitic and oleic comprise from 1 to 5 phr and preferably, 1 to about 2 phr. Typical amounts of zinc oxide comprise 2 to 5 phr. Typical amounts of waxes comprise 1 to 5 phr. Typical amounts of oils comprise 5 to 40 phr. Typical amounts of peptizers comprise 0.1 to 1 phr. The presence and relative amounts of the above additives are not an aspect of the present invention.

The vulcanization of the rubber stock is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 2.25 being preferred.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The rubber stocks containing the phenoxyacetic acid may be used in the preparation of composite products including tires, power belts, conveyor belts, printing rolls, rubber shoe heels and soles, rubber wringers, automobile floor mats, mud flaps for trucks, ball mill liners, and the like. Preferably, the rubber vulcanizates are used in wire coat stocks, carcass ply or overlay compounds for tires.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTMD-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), minutes to 2 dN-m rise above min. torque (t2), minutes to 25% of the torque increase (t25), minutes to 90% of the torque increase (t90) and difference between the maximum torque and minimum torque (delta torque).

Peel adhesion (Strebler Adhesion) testing was done to determine the interfacial adhesion between various rubber formulations that were prepared. The interfacial adhesion was determined by pulling one compound away from another at a right angle to the untorn test specimen with the two ends being pulled apart at a 180 degree angle to each other using an Instron machine. The area of contact was determined from placement of a Mylar sheet between the compounds during cure. A window in the Mylar allowed the two materials to come into contact with each other during testing. In the testing cited herein, the same compound was used in both sides of the Strebler tear sample.

Shore Hardness was determined in accordance with ASTM-1415.

Example 1

This example was conducted to evaluate the physical properties of a rubber stock containing phenoxyacetic acid alone (Sample 3) or in combination with stearic acid (Sample 4) versus a rubber stock containing no stearic acid (Sample 1) or stearic acid alone (Sample 2).

Table I below shows the basic rubber stock that was used in this example. The rubber compound was prepared in a 2-stage Banbury mix. All parts and percentages are by weight unless otherwise noted. The cure data as well as other physical data for each sample are listed in Table II.

TABLE I

| NON-PRODUCTIVE | |
| --- | --- |
| Polyisoprene[1] | 100.0 |
| Carbon Black | 50.0 |
| Processing Oil | 5.0 |
| Zinc Oxide | 5.0 |
| Antidegradant[2] | 2.0 |
| Stearic Acid | Varied |

TABLE I-continued

| Phenoxyacetic Acid | Varied |
| --- | --- |
| PRODUCTIVE | |
| Accelerator[3] | 1.00 |
| Sulfur | 1.4 |
| Retarder[4] | 0.2 |

[1] Natsyn ® 2200
[2] Polymerized 1,2-dihydro-2,2,4-trimethyldihydroquinoline
[3] N-tert.-butyl-2-benzothiazolesulfenamide
[4] N-(cyclohexylthio)phthalimide Table II indicates the amounts of stearic acid and/or phenoxyacetic acid that was used in each sample. The stearic acid and phenoxyacetic acid were added to the rubber stocks in the non-productive stage.

TABLE II

| | Control Sample 1 | Control Sample 2 | Sample 3 | Sample 4 |
| --- | --- | --- | --- | --- |
| Stearic Acid (phr) | 0 | 2 | 0 | 2 |
| Phenoxyacetic Acid (phr) | 0 | 0 | 2 | 2 |
| Rheometer | | | | |
| T max (dN-m) | 36.8 | 38.9 | 39.8 | 41.3 |
| T min (dN-m) | 10.5 | 9.8 | 10.5 | 9.1 |
| T 25 (min.) | 13.8 | 12.2 | 10.2 | 7.6 |
| T 90 (min.) | 16.1 | 16.2 | 17.6 | 15.9 |
| Stress-Strain | | | | |
| 100% Modulus (MPa) | 1.41 | 1.96 | 2.41 | 2.54 |
| 300% Modulus (MPa) | 6.93 | 10.34 | 11.59 | 12.16 |
| Tensile Strength (MPa) | 17.3 | 23.0 | 21.6 | 22.6 |
| Elongation at Break (%) | 577 | 571 | 516 | 522 |
| Hardness, RT | 57.4 | 61.7 | 66.4 | 68.7 |
| Hardness, 100° C. | 51.6 | 56.9 | 61.2 | 61.1 |
| Rheovibron | | | | |
| E' at 60° C.(MPa) | 11.3 | 12.1 | 17.5 | 22.2 |
| Tan Delta at 60° C. | 0.114 | 0.080 | 0.075 | 0.065 |
| Compression Modulus | | | | |
| 10% (lbs.) | 11.0 | 15.0 | 15.7 | 20.7 |
| 20% (lbs.) | 21.0 | 28.3 | 28.8 | 36.0 |
| 30% (lbs.) | 32.8 | 44.0 | 45.0 | 54.0 |
| Rebound (ASTM 1054) | | | | |
| 100° C.(%) | 55.7 | 63.6 | 60.8 | 60.1 |
| Room Temperature (%) | 45.2 | 47.9 | 48.9 | 47.2 |

The data above show that the use of phenoxyacetic acid acts somewhat like stearic acid (increased modulus, both stress-strain and compression and increased rebound at about equivalent effect per part) but the PAC also provides substantial hardness and dynamic storage modulus (E') increases that are unique to it, and not seen with stearic acid. Thus, PAC not only functions as a curing aid, like stearic acid, it contributes unique and unexpected hardness and dynamic storage modulus increases not previously observed.

Example 2

Table III below shows the basic rubber stock that was used in this example. This example was conducted to demonstrate the efficiency of phenoxyacetic acid as a silica coupling agent. The rubber compound was prepared in a two-stage Banbury mix. All parts and percentages are by weight unless otherwise noted. The cure data as well as other physical data for each sample are listed in Table IV.

TABLE III

| NON-PRODUCTIVE | |
|---|---|
| Polyisoprene[1] | 100.0 |
| Carbon Black | 35.0 |
| Processing Oil | 5.0 |
| Zinc Oxide | 5.0 |
| Silica[2] | 15.0 |
| Antidegradant[3] | 2.0 |
| Stearic Acid | 1.0 |
| Silane Coupling Agent[4] | Varied |
| Phenoxyacetic Acid | Varied |
| PRODUCTIVE | |
| Accelerator[5] | 1.0 |
| Sulfur | 1.4 |
| Retarder[6] | 0.2 |

[1]Natsyn ® 2200
[2]HiSil ®, a precipitated silica commercially available from PPG Industries having a surface area of 150 m² per gram
[3]Polymerized 1,2-dihydro-2,2,4-trimethyldihydroquinoline
[4]bis-(3-triethoxysilylpropyl)tetrasulfide (50% active) commercially available as Si69 from Degussa.
[5]N-tert-butyl-2-benzothiazolesulfenamide.
[6]N-(cyclohexylthio)phthalimide

TABLE IV

| | Control Sample 1 | Control Sample 2 | Sample 3 |
|---|---|---|---|
| Silane Coupling Agent[1] | 0 | 3 | 0 |
| Phenoxyacetic Acid | 0 | 0 | 2 |
| Rheometer | | | |
| Tmax (dN-m) | 31.4 | 36.1 | 34.2 |
| Tmin (dN-m) | 11.2 | 10.8 | 8.4 |
| T25 (min.) | 15.2 | 13.1 | 12.3 |
| T90 (min.) | 20.9 | 18.5 | 19.4 |
| Stress Strain | | | |
| 100% Modulus (MPa) | 1.04 | 1.66 | 1.39 |
| 300% Modulus (MPa) | 4.09 | 7.37 | 6.17 |
| Tensile Strength (Mpa) | 11.3 | 15.5 | 19.7 |
| Elongation @ Break (%) | 572 | 541 | 644 |
| Hardness - Shore A | | | |
| Hardness, RT | 52.0 | 59.0 | 59.6 |
| Hardness, 100° C. | 46.9 | 55.0 | 55.3 |
| Rebound (ASTM D1054) | | | |
| Rebound, RT | 45 | 47 | 45 |
| Rebound, 100° C.(%) | 54 | 58 | 57 |
| Tear Strebler to Self, (N) | 198 | 224 | 204 |
| Rheovibron | | | |
| E' at 60° C.(MPa) | 8.0 | 10.9 | 16.6 |
| Tan Delta at 60° C. | 0.161 | 0.145 | 0.122 |
| Compression Modulus | | | |
| 10% (lbs.) | 10.0 | 15.2 | 16.3 |
| 20% (lbs.) | 17.8 | 27.0 | 26.8 |
| 30% (lbs.) | 27.5 | 41.0 | 38.5 |
| Goodrich Blowout | | | |
| Time (min.) | 18 | 33 | 42 |
| Temperature (°C.) | 82.5 | 67 | 60.5 |

[1]bis-(3-triethoxysilylpropyl)tetrasulfide (50% active) commercially available as Si69 from Degussa.

The data in Table IV illustrate that PAC provides properties similar to those of the coupling agent (increased compression and stress strain modulus, Tmax) but has advantages over it for storage modulus (E'), tensile and minimum Rheometer torque (Tmin)based on Example 2. The improved tensile and lower Tmin indicate unique interaction of PAC with HiSil. The lower Tmin would also indicate the potential for improved processing in HiSil containing compounds.

Example 3

The rubber stocks of Example 3 contained the ingredients listed in Table V. This example was conducted to demonstrate the efficiency of phenoxyacetic acid as a silica coupling agent. It also compares the effect of silane coupling agent and higher levels of added stearic acid. Samples 2 and 3 demonstrate that the addition of 2 or 4 phr stearic acid provides some improvement in the cured properties of a silica containing compound when compared to Sample 1. However, the addition of silane coupling agent or phenoxyacetic, Samples 4 and 5, provides even further improvement in properties, particularly modulus and hardness. The best overall properties were obtained with the phenoxyacetic acid when modulus and hardness are desired. The phenoxyacetic acid (Sample 5) also gave the lowest minimum torque on the Monsanto rheometer which would indicate the best processing.

TABLE V

| NON-PRODUCTIVE 1 | |
|---|---|
| Polyisoprene[1] | 100 |
| Carbon Black | 35 |
| Processing Oil | 5 |
| Zinc Oxide | 5 |
| Antidegradant[2] | 2 |
| NON-PRODUCTIVE 2 | |
| Silica[3] | 15 |
| Stearic Acid | Varied |
| Silane Coupling Agent[4] | Varied |
| Phenoxyacetic Acid | Varied |
| PRODUCTIVE | |
| Accelerator[5] | 1.0 |
| Sulfur | 1.4 |
| Retarder[6] | 0.2 |

[1]Natsyn ® 2200
[2]Polymerized 1,2-dihydro-2,2,4-trimethyldihydroquinoline
[3]Hi Sil ®, a precipitated silica commercially available from PPG Industries having a surface area of 150 m² per gram.
[4]bis-(3-triethoxysilylpropyl)tetrasulfide (50% active) commercially available as Si69 from Degussa.
[5]N-tert-butyl-2-benzothiazolesulfenamide.
[6]N-(cyclohexylthio)phthalimide.

TABLE VI

| | Control Sample 1 | Control Sample 2 | Control Sample 3 | Control Sample 4 | Sample 5 |
|---|---|---|---|---|---|
| Stearic Acid | 0 | 2.0 | 4.0 | 2.0 | 2.0 |
| Silane Coupling Agent | 0 | 0 | 0 | 3.0 | 0 |
| Phenoxyacetic Acid | 0 | 0 | 0 | 0 | 2.0 |
| Rheometer | | | | | |
| Tmax (dN-M) | 29.0 | 26.8 | 28.2 | 32.6 | 32.2 |
| Tmin (dN-m) | 9.9 | 6.6 | 5.3 | 6.3 | 4.8 |
| T25 (min.) | 14.1 | 20.4 | 17.0 | 15.1 | 13.7 |
| T90 (min.) | 20.2 | 26.6 | 23.3 | 21.0 | 21.6 |
| Stress Strain | | | | | |
| 100% Modulus (MPa) | 1.06 | 0.99 | 1.25 | 1.77 | 1.55 |

TABLE VI-continued

|  | Control Sample 1 | Control Sample 2 | Control Sample 3 | Control Sample 4 | Sample 5 |
|---|---|---|---|---|---|
| 300% Modulus (MPa) | 4.18 | 4.31 | 5.79 | 8.64 | 7.15 |
| Tensile Strength (MPa) | 10.7 | 17.1 | 20.4 | 21.4 | 20.4 |
| % Elongation @ Break (%) | 561 | 686 | 666 | 611 | 607 |
| Hardness, RT | 51.5 | 48.1 | 51.3 | 57.2 | 59.9 |
| Hardness, 100° C. | 43.7 | 43.0 | 45.5 | 53.1 | 53.5 |
| Rebound, RT | 42.0 | 44.5 | 45.1 | 47.2 | 42.6 |
| Rebound, 100° C. | 49.7 | 56.0 | 61.3 | 61.6 | 57.6 |
| Rheovibron |  |  |  |  |  |
| E' at 60° C.(MPa) | 6.3 | 7.9 | 8.8 | 10.7 | 15.6 |
| Tan Delta, 60° C. | 0.145 | 0.125 | 0.104 | 0.111 | 0.090 |

Looking at the above data in Table VI, one can see the advantage of the present invention. By comparing Samples 2, 4 and 5, it can be seen that the property improvements seen in Examples 1 and 2 (increased E', reduced Tmin) are realized with the addition of 2 phr of stearic acid. The special interaction between stearic acid and PAC (when HiSil is present) is especially evident in the non-additive behavior of the properties (Tmax, 300% modulus, compression and T25, T90, E') of Samples 2, 3 and 5. In Example 1 (all carbon black), the change in some properties (Tmax, compression and stress strain modulus) due to the addition of both PAC and stearic acid was a sum of the effect of adding stearic acid alone and PAC alone and the effect of each was similar in magnitude. This is not the case in Example 3 (with HiSil) where the effect on Tmax, for example, is much different for the addition of stearic acid (Sample 3) versus the addition of PAC (Sample 5).

Example 4

The rubber stocks of Example 4 contained the ingredients listed in Table VII. This example was conducted in order to demonstrate the effectiveness of phenoxyacetic acid as a silica coupling agent versus the use of a silane coupling agent or 4-formylphenoxyacetic acid. Table VIII below provides the physical properties of each sample as well as the respective amount of silane coupling agent, phenoxyacetic acid, and 4-formylphenoxyacetic acid. The phenoxyacetic acid and the 4-formylphenoxyacetic acid were added at the nonproductive stage or the productive stage.

TABLE VII

| Non-Productive |  |
|---|---|
| Polyisoprene[1] | 100.0 |
| Carbon Black | 35.0 |
| Silica[2] | 15.0 |
| Processing Oil | 5.0 |
| Zinc Oxide | 5.0 |
| Antidegradant[3] | 2.0 |

TABLE VII-continued

| Stearic Acid | 2.0 |
|---|---|
| Silane Coupling Agent[4] | Varied |
| Phenoxyacetic Acid | Varied |
| 4-formylphenoxy Acetic Acid | Varied |
| Productive |  |
| Accelerator[5] | 1.0 |
| Sulfur | 1.4 |
| Retarder[6] | 0.2 |
| Phenoxyacetic Acid | Varied |
| 4-formyl-phenoxyacetic Acid | Varied |

[1]Natsyn ® 2200
[2]HiSil ®, a precipitated silica commercially available from PPG Industries having a surface are of 150 m² per gram
[3]Polymerized 1,2-dihydro-2,2,4-trimethyldihydroquinoline
[4]bis-(3-triethoxysilylpropyl)tetrasulfide (50% active) commercially available as Si69 from Degussa.
[5]N-tert-butyl-2-benzothiazolesulfenamide
[6]N-(cyclohexylthio)phthalimide

TABLE VIII

|  | Sample 1 Control | Sample 2 | Sample 3 Control | Sample 4 | Sample 5 Control |
|---|---|---|---|---|---|
| Silane Coupling Agent | 3 | 0 | 0 | 0 | 0 |
| Phenoxyacetic Acid (Non Prod) | 0 | 2.5 | 0 | 0 | 0 |
| 4-formylphenoxyacetic Acid (Non Prod) | 0 | 0 | 3.0 | 0 | 0 |
| Phenoxyacetic Acid (Productive) | 0 | 0 | 0 | 2.5 | 0 |
| 4-formylphenoxyacetic Acid (Productive) | 0 | 0 | 0 | 0 | 3.0 |
| Rheometer |  |  |  |  |  |
| Tmax (dN-m) | 29.8 | 29.2 | 28.0 | 29.1 | 28.1 |
| Tmin (dN-m) | 7.8 | 5.8 | 7.4 | 6.2 | 8.2 |
| T90 (min.) | 17.5 | 14.7 | 19.0 | 15.5 | 18.0 |
| Hardness |  |  |  |  |  |
| Room Temp | 61 | 61 | 63 | 62 | 62 |

Looking at the above data in Table IV, one can see the advantages of the present invention and further illustrating the use of phenoxy acetic acid versus the controls. In particular, the lower min. torque values for the rubber stocks of the present invention demonstrate a significant advantage when it comes to processability of the rubber.

Example 5

This example was conducted to determine the effectiveness of phenoxyacetic acid as a methylene acceptor. The rubber stocks of Example 5 contained the ingredients listed in Table IX. Table X below provides the physical properties of each sample as well as the respective amount of carbon black, silica, phenoxyacetic acid, resorcinol and methylene donor (hexamethoxymethyl melamine).

TABLE IX

| NON-PRODUCTIVE |  |
|---|---|
| Polyisoprene[1] | 100.0 |
| Carbon Black | Varied |
| Processing Oil | 5.0 |

TABLE IX-continued

| | |
|---|---|
| Silica[2] | Varied |
| Zinc Oxide | 5.0 |
| Antidegradant[3] | 2.0 |
| Stearic Acid | 2.0 |
| Hexamethoxymethyl Melamine | Varied |
| Phenoxyacetic Acid | Varied |
| Resorcinol | Varied |
| PRODUCTIVE | |
| Accelerator[4] | 1.00 |
| Sulfur | 1.4 |

[1]Natsyn ® 2200
[2]HiSil ®, a precipitated silica commercially available from PPG Industries having a surface area of 150 m² per gram.
[3]Polymerized 1,2-dihydro-2,2,4-trimethyldi-hydroquinoline
[4]N-tert-butyl-2-benzothiazolesulfenamide

TABLE X

| | Control Sample 1 | Control Sample 2 | Sample 3 | Sample 4 | Control Sample 5 | Control Sample 6 | Control Sample 7 | Sample 8 | Sample 9 |
|---|---|---|---|---|---|---|---|---|---|
| Carbon Black | 35 | 35 | 35 | 35 | 35 | 50 | 50 | 50 | 50 |
| Silica | 15 | 15 | 15 | 15 | 15 | 0 | 0 | 0 | 0 |
| Hexamethoxy-methylmelamine | 0 | 2.5 | 0 | 2.5 | 2.5 | 0 | 2.5 | 0 | 2.5 |
| Phenoxy-acetic Acid | 0 | 0 | 2.5 | 2.5 | 0 | 0 | 0 | 2.5 | 2.5 |
| Resorcinol | 0 | 0 | 0 | 0 | 2.5 | 0 | 2.5 | 0 | 0 |
| Rheometer | | | | | | | | | |
| Tmax (min.) | 26.9 | 28.4 | 30.1 | 31.1 | 26.6 | | | | |
| Tmin (min.) | 7.7 | 7.0 | 5.5 | 5.9 | 8.0 | | | | |
| T25 (min.) | 13.1 | 11.7 | 8.3 | 7.7 | 8.9 | | | | |
| T90 (min.) | 19.2 | 19.0 | 16.3 | 15.0 | 29.7 | | | | |
| Stress Strain | | | | | | | | | |
| 100% Modulus (MPa) | 1.48 | 1.49 | 1.70 | 1.72 | — | | | | |
| 300% Modulus (Mpa) | 6.90 | 7.05 | 8.39 | 7.51 | — | | | | |
| Tensile Strength (MPa) | 24.2 | 25.8 | 26.5 | 24.7 | — | | | | |
| Elongation @ Break (%) | 601 | 607 | 569 | 580 | — | | | | |
| Hardness RT | 53 | 58 | 60 | 61 | 53 | 61 | 67 | 64 | 67 |

This shows that PAC in the presence of HiSil provides higher stiffness (hardness) than resorcinol when combined with the methylene donor hexamethoxymethyl melamine. In an all CB formulation the PAC gives hardness values equivalent to resorcinol when used as a methylene acceptor.

What is claimed is:

1. A rubber stock comprising (1) a rubber selected from the group consisting of natural rubber, rubbers derived from a diene monomer and mixtures thereof, (2) from about 0.1 to about 10.0 phr of phenoxyacetic acid, (3) from about 15 to about 100 phr of a precipitated silica, and (4) from about 0.1 phr to about 10.0 phr of a methylene donor selected from the group consisting of hexamethylene tetramine, hexamethoxymethyl melamine, lauryloxymethyl pyridinium chloride, ethyloxymethyl pyridinium chloride, trioxan hexamethylolmelamine, paraformaldehyde, N,N',N''-trimethyl/N,-N',N''-trimethylolmelamine, hexamethylolmelamine, N,N',N''-dimethylolmelamine, N-methylolmelamine, N,N'-dimethylolmelamine, N,N',N''tris(methoxymethyl)melamine and N,N',N''tributyl-N,N',N''-trimethylolmelamine, and methylene donors of the general formula:

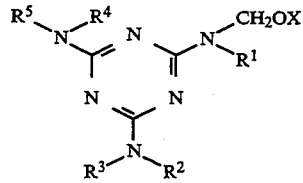

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group —$CH_2OX$ and their condensation products.

2. The rubber stock of claim 1 wherein the phenoxyacetic acid ranges from about 2.0 to about 5.0 phr.

3. The rubber stock of claim 1 wherein the methylene donor is selected from the group consisting of hexamethylene tetramine, hexamethoxymethyl melamine, lauryloxymethyl pyridinium chloride, ethyloxymethyl pyridinium chloride, trioxan hexamethylolmelamine and paraformaldehyde.

4. The rubber stock of claim 1 wherein the methylene donor is selected from the general formula:

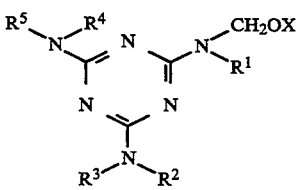

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group —$CH_2OX$ and their condensation products.

5. The rubber stock of claim 1 wherein the methylene donor is selected from the group consisting of N,N',N''-trimethyl/N,N',N''-trimethylolmelamine, hexamethylolmelamine, N,N',N''-dimethylolmelamine, N-methylolmelamine, N,N'-dimethylolmelamine, N,N',N"tris(methoxymethyl)melamine and N,N',N"tributyl-N,N',N"-trimethylol-melamine.

6. The rubber stock of claim 1 wherein the weight ratio of methylene donor to the phenoxyacetic acid may range from 1:10 to about 10:1.

7. The rubber stock of claim 6 wherein the weight ratio of methylene donor to the phenoxyacetic acid may range from about 1:3 to about 3:1.

8. The rubber stock of claim 1 wherein said rubber derived from a diene monomer is selected from the group consisting of cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

9. The rubber stock of claim 1 containing from about 50 phr to about 100 phr of a precipitated silica filler.

10. The rubber stock of claim 1 wherein the precipitated silica has a surface area ranging from about 70 $m^2$ per gram to 250 $m^2$ per gram.

11. A rubber stock of claim 1 where the compound contains 1 to 5 phr of a fatty acid selected from the group consisting of stearic acid, palmitic acid and oleic acid.

* * * * *